April 15, 1924.
H. W. HAYES
ARTIFICIAL CASTING MINNOW
Filed March 13, 1922
1,490,389
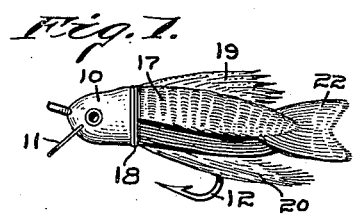
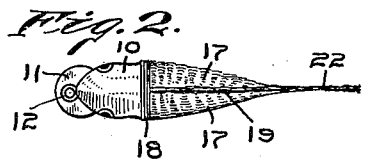
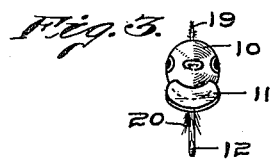
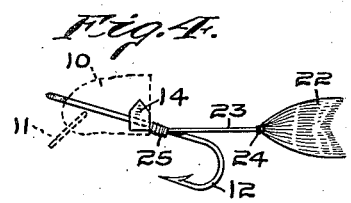
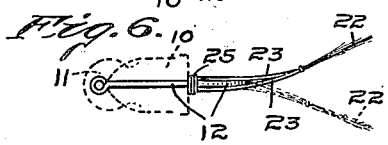
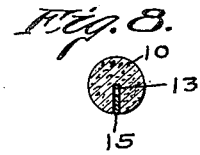
INVENTOR:
Harry W. Hayes,
By Frank W. Woerner
ATTORNEY.

Patented Apr. 15, 1924.

1,490,389

UNITED STATES PATENT OFFICE.

HARRY W. HAYES, OF INDIANAPOLIS, INDIANA.

ARTIFICIAL CASTING MINNOW.

Application filed March 13, 1922. Serial No. 543,144.

*To all whom it may concern:*

Be it known that I, HARRY W. HAYES, a citizen of the United States, residing at Indianapolis, in the county of Marion and State of Indiana, have invented certain new and useful Improvements in Artificial Casting Minnows, of which the following is a specification.

This invention relates to an artificial minnow for casting purposes when fishing; and one of the objects of the invention consists in the provision of an artificial minnow of the above character, adapted to carry a fishing hook, which is extremely light in weight, and the outline and arrangement of colors being such as to impart substance and the general effect of a live minnow.

A further object of the invention is to provide an artificial minnow of the above character which is so constructed as to contain a certain degree of flexibility in its rear body portion and tail, so as to lend animation when in use and to prevent permanent distortion of the minnow.

A still further object of the invention is to provide an artificial minnow for casting purposes wherein the hook is so mounted as to impart a low center of gravity to the body to insure its proper riding upon the water irrespective of the position the minnow may be in when it strikes the surface of the water.

A still further object of the invention consists in the provision of a minnow of the above character in which breakage and increase in cost of manufacture are greatly reduced.

A still further object of the invention consists in the provision of an artificial minnow of the above character in which the fishing hook and body portion are maintained in proper relation at all times.

I accomplish the above objects of the invention, and such others as may appear from a perusal of the following description and claims, by means of the construction illustrated in the accompanying drawings, forming a part hereof, in which—

Figure 1 is a side elevation of my new improved artificial minnow, Fig. 2 is a top or plan view of the construction shown in Fig. 1. Fig. 3 is an end view of the construction shown in Fig. 1. Fig. 4 is a side elevation showing the relative positions of the fishing hook and tail-piece of the minnow. Fig. 5 is a top or plan view of the construction shown in Fig. 4. Fig. 6 is a view similar to Fig. 5 except that the resilient character of the tail is shown. Fig. 7 is an underside plan view of the body of the minnow in which the remaining parts are omitted. Fig. 8 is a cross section of the body of the minnow.

In carrying my invention into practice, I preferably form the forward portion of the body of the minnow of cork or other buoyant material 10 which is shaped at one end to resemble the head of a live minnow, and at the forward and under edge of the head—at a point where the mouth of a natural minnow would be—I insert a transverse fin 11, composed usually of transparent material, which inclines forwardly and downwardly and when acted upon by the water serves to keep the minnow on an even keel when it is drawn through the water.

The body portion 10 of the minnow forms the means for attaching and supporting a fishing hook 12. The bodies of artificial minnows heretofore have been slitted longitudinally to a depth of about one-half of their diameters, and these slits were employed to form the avenue for the introduction of the shanks of the fishing hooks. The introduction of the shanks of the hooks was accomplished by spreading or prying apart the slitted portions of the bodies, and this quite frequently resulted in so extending the slit that the bodies were completely broken and rendering them unfit for service and increasing thereby the cost of manufacture. I have been able to overcome this breakage and waste by providing each body 10 on its under side with a longitudinally disposed groove or kerf 13 which is of sufficient width to accommodate the shank of a fishing hook without imposing any spreading action on the body 10. Kerf 13 is cut the desired depth and angle so that when the fishing hook 12 is in position it will incline rearwardly and downwardly to bring the greatest weight of the hook below body 10 and thus so lower the center of gravity as to insure that body 10 will always float right side up irrespective of the position the body may be in when it strikes the water, which is of utmost importance. To prevent hook 12 from turning in body 10 I secure a small vertically disposed plate 14 to the shank of the fishing hook, the upper end of the plate being forced into the material forming said body. After the fishing hook has been properly positioned kerf 13 is closed by means of a plug 15 (Fig. 8) which is of such width to exactly fit the inner dimensions of the kerf, which plug may be securely held in place by gluing or by nailing, as desired.

The rear body portion of the minnow is formed preferably by means of suitable feathers 17 which are arranged around and are secured to the buoyant portion 10 by passing a fine thread 18 circumferentially around portion 10 of the body. The feathers 17 are arranged and so shaped as to impart a graceful outline to the body of the minnow. The minnow may also be provided with the upper and lower fins 19 and 20 respectively, and these are preferably composed of feathers which may be colored so as to contrast them from the feathers 17 forming the body of the minnow, if desired.

To faithfully carry out the general appearance so as to resemble a live minnow, the artificial minnow is also provided with a tail-piece 22 which, similar to the rear body portion and fins 19 and 20, is composed of feathers. The method of mounting the tail-piece 22 exemplifies one of the novel features of the invention and consists in building into it a certain amount of resiliency so that the tail may yield laterally when the forces of varying currents of water play against it, to lend an element of animation. To accomplish this novel feature, I attach the tail-piece 22 to the joined ends of a pair of extremely slender resilient sinews 23 by means of the thread 24, and these sinews extend towards the body portion 10 and are spread a sufficient distance apart so as to embrace the shank of a fishing hook to which they are attached by means of the threads 25. This spreading apart of sinews 23 at their base forms a brace for maintaining the tail-piece 22 in proper alinement with body portion 10 under normal conditions, but when the tail-piece meets any counter currents or movements of the water it may momentarily yield laterally by reason of the resilient character of sinews 23, as clearly shown in Fig. 6, and after the active forces of such counter currents have moved past the tail-piece will immediately return to its normal position under the inherent righting properties of the resilient sinews 23. These lateral movements of the tail lend more or less animated activity to the artificial minnow and tend to more accurately portray the actions of a live minnow.

The foregoing description is merely illustrative of the principles of my invention, and other modifications thereof may be made that will function in substantially the same manner without departing from the spirit of the invention, and I do not, therefore, desire to limit myself to the use of the specific form or parts illustrated.

Having thus fully described my said invention, what I desire to secure by Letters Patent, is—

1. An artificial minnow for casting purposes which comprises a buoyant head portion, a fishing hook supported by said buoyant portion and extending downwardly therefrom, a tail member, means for resiliently supporting the tail member from the buoyant portion, and pliable means attached to the buoyant portion to form the body of the minnow between the buoyant head portion and tail member.

2. An artificial minnow for casting purposes which comprises a buoyant portion, a fishing hook supported in said buoyant portion, a tail member, means comprising a resilient support for resiliently supporting the tail member from the buoyant portion, pliable means attached to the buoyant portion to complete the body of the minnow between the buoyant portion and tail member, and a tranverse fin arranged in the forward end of the buoyant portion and extending forwardly and downwardly therefrom for maintaining the body of the minnow on an even keel at all times.

3. An artificial minnow for casting purposes which comprises a buoyant head portion having a longitudinal kerf formed in its bottom surface, a fishing hook arranged in the kerf and extending obliquely relatively to the longitudinal axis of the buoyant portion to bring the bulk of the weight of the hook below and outside of the buoyant portion, a tail member resiliently supported by said buoyant portion and susceptible to lateral bending movements independently of its support, and means consisting of pliable material secured to the buoyant portion for rounding out and wholly forming the body of the minnow between the buoyant portion and tail member.

4. An artificial minnow for casting purposes which comprises a buoyant portion having a longitudinal kerf in its bottom surface, a fishing hook arranged in said kerf and extending into the vertical plane of the axis and obliquely relatively to the longitudinal axis of the buoyant portion to bring the bulk of the weight of the hook below the buoyant portion, a plate attached to the shank of the fishing hook lying within the kerf to prevent independent movement between the hook and buoyant portion, a plug for closing the kerf, a tail member resiliently supported by the buoyant portion, and pliable material attached to the buoyant portion for rounding out the body of the minnow between the buoyant portion and tail member.

5. An artificial minnow for casting purposes which comprises a buoyant portion, a fishing hook supported in said buoyant portion, a tail member, means comprising a pair of slender resilient sinews having the tail member attached to their outer joined ends and having their inner ends separated to embrace the fishing hook, means for attaching the adjacent ends of the sinews to the fishing hook, and pliable means attached to the buoyant portion for rounding out the body of the minnow between the buoyant portion and tail member.

In witness whereof I have hereunto set my hand and seal at Indianapolis, Indiana, this 8th day of March, A. D. one thousand nine hundred and twenty-two.

HARRY W. HAYES. [L. S.]